United States Patent [19]

De Vries

[11] Patent Number: 5,587,001
[45] Date of Patent: Dec. 24, 1996

[54] PROCESS FOR TREATING IRON-CONTAINING SULFIDIC ROCKS AND ORES

[75] Inventor: Nadine H. C. De Vries, Wilmington, Del.

[73] Assignee: E. I. Du Pont de Nemours and Company, Wilmington, Del.

[21] Appl. No.: 431,215

[22] Filed: Apr. 28, 1995

[51] Int. Cl.[6] ............................... C22B 3/06; C22B 3/12
[52] U.S. Cl. ................................. 75/743; 75/744
[58] Field of Search ........................ 75/743, 744

[56] References Cited

U.S. PATENT DOCUMENTS 4,421,724  12/1983  Hunnel ........................ 423/22
5,034,055  7/1991   Rowson ....................... 75/744

OTHER PUBLICATIONS

John Marsden, Iain House, The Chemistry of Gold Extraction, *Ellis Horwood*, pp. 191–193, 276–277, 1992.
F. W. McQuiston, Jr., R. S. Shoemaker, Gold and Silver Cyanidation Plant Practice Monograph, *The American Institute of Mining, Metallurgical, and Petroleum Engineers, Inc.*, 1975 pp. 1–25, 67, 68, 71, 72, 75, 76 & 79.
International Land Reclamation and Mine Drainage Conference and Third Inernational Conference on the Abatement of Acidic Drainage, vol. 2 of 4, *Bureau of Mines Special Publication SP 06B–94*, Surface Chemical Methods of Forming Hardpan In Pyrrhotite Tailings and Prevention of the Acid Mine Drainage; Potential Microencapsulation of Pyrite By Artificial Inducement of FEPO4 Coatings; Laboratory Testong of Coatings for Prevention of Acid Drainage in Underground Coal Mines Apr. 1994.

*Primary Examiner*—Melvyn Andrews
*Attorney, Agent, or Firm*—George A. Frank

[57] ABSTRACT

A process is provided for pretreating iron-containing sulfidic ores of precious metals or other such sulfidic rocks with a source of manganate ions prior to lixiviation to form a layer of manganese oxide, thereby reducing the consumption of lixiviation reagents or reducing acid rock drainage.

8 Claims, No Drawings

PROCESS FOR TREATING IRON-CONTAINING SULFIDIC ROCKS AND ORES

FIELD OF THE INVENTION

This invention is related to a hydrometallurgical process for extracting metals from iron-containing sulfidic ores and to limiting acid rock drainage from sulfidic iron-containing mineral-bearing rocks, and particularly to the pretreatment of ores to render the sulfides non-reactive to the reagents in the lixiviant system.

TECHNICAL BACKGROUND

For recovering gold and/or other precious metals from ores, a number of lixiviant systems have been proposed and used over the past century. The word "lixiviate" means to extract a constituent from a solid mixture. A lixiviant system is one that contains the components necessary to extract the desired constituent. The most widely used lixiviant system for gold is a combination of sodium cyanide as ligand together with air (oxygen) as oxidant. Hydrogen peroxide is sometimes used as an auxiliary oxidizing agent. Ores which are resistant to simple extraction or lixiviation procedures are commonly referred to as "refractory" ores.

Many gold-bearing deposits in rock were created by the precipitation of gold along with sulfide minerals during the flow of hydrothermal fluids through the rock. Depending on the deposition mechanism, the sulfide minerals can be present alongside the gold or can physically encapsulate it. Over time, the zone of such deposits nearest the earth's surface will have been oxidized by weathering, and the sulfides so oxidized carried away by groundwater flow. This zone is referred to as the "oxide zone". In the deepest portions of the deposits, below the water table, the sulfide minerals remain more or less in the form in which they were deposited. This zone is referred to as the "sulfide zone". The relative size of these zones is determined by the depth of the deposit, historical water table fluctuations and surface weathering conditions, among other factors.

Where the sulfide minerals persist in such a gold-bearing deposit, they demonstrate varying degrees of reactivity to sodium cyanide, the chemical lixiviant commonly used in gold leaching, and to oxygen, consuming them and requiring the addition of fresh materials. While some iron-containing sulfide minerals such as pyrite and chalcopyrite exhibit relatively low reactivity during the time span of most gold lixiviation processes, others such as pyrrhotite are highly reactive. The added processing cost due to consumption of lixiviant chemicals by a high concentration of these highly reactive minerals can make metal recovery from portions or all of a gold-bearing deposit uneconomic.

In the case of gold deposits where the gold is physically encapsulated in the sulfide minerals, the minerals can create a surface barrier which prevents the gold from being extracted. In this case, procedures such as roasting, pressure oxidation or biological oxidation of the deposit can be employed. Such procedures are very capital-intensive and costly.

In cases where the sulfide minerals do not physically block the access of the lixiviant solution to the gold, that is, the minerals are present with the gold but do not encapsulate it, an excess of lixiviant can be used, or the gold deposit can be pretreated in some way to passivate the surface of the sulfide minerals to make them less reactive to the lixiviant solution.

For example, the use of dissolved oxygen as a pretreatment step before cyanide leaching is described in "The Chemistry of Gold Extraction" by Marsden and House, pages 191–193 and 277, publisher Ellis Horwood, 1992. It is stated that, while this pretreatment can oxidize and/or passivate the surfaces of some of the more reactive, reagent-consuming, sulfides, it is often only Capable of partial oxidation of sulfides and is usually unsuitable for the treatment of ores where gold is intimately mixed with sulfides. It is further stated that "ores containing significant amounts of sulfides that cannot be passivated adequately by pre-aeration, and which result in unacceptable cyanide and/or oxygen consumption, must be treated by alternative processes, e.g. pressure oxidation, roasting."

Variations on this method of pretreatment include treatment of the ore with lime as well as air, or treatment of the ore with a chemical oxidizing system containing calcium hypochlorite. These methods are discussed in "Gold and Silver Cyanidation Plant Practices" by McQuiston and Shoemaker, pages 12–13, The American Institute of Mining, Metallurgical and Petroleum Engineers, 1975. These methods are often not completely effective in passivating the sulfide-containing ores.

U.S. Pat. No. 4,421,724 discloses a process for eliminating such pretreatments for precious metal recovery by modifying the cyanide extraction step itself. In this process, a commuted, refractory precious metal ore is agitationally treated with an aerated alkaline solution containing a high concentration of cyanide ion, 112 to 336 grams per gallon, and a low concentration of chemical oxidizer, 0.5 to 10 grams per gallon. The patent exemplifies potassium permanganate and other manganates as chemical oxidizers, and states that any suitable chemical oxidizer can be employed which can supply solubilized oxygen for enhancing the rate of precious metal solubilization and, at the same time, convert refractorizing constituents such as sulfides and arsenides into forms which are substantially inert to cyanide and air source oxygen. This process has the disadvantage of requiring unusually high cyanide concentrations.

U.S. Pat. No. 5,034,055 discloses a process for recovering gold and silver values from ore using activated carbon as adsorbent for the metal values wherein said activated carbon treated with an oxidant having an oxidation potential higher than that of oxygen. A preferred oxidant is potassium permanganate. The actual addition point of the oxidant may be before, after or during the leaching stage. Wherever added, its primary function is to treat the activated carbon so as to increase the recovery of silver. When the oxidant is added before the leaching stage, it also can function as an auxiliary oxidizing agent in the leaching solution before going on to treat the activated carbon. This patent does not disclose a method of reducing reagent consumption in a lixiviant system by pretreatment of the gold ore.

There is a need for an effective pretreatment for refractory gold-bearing deposits which contain iron-containing sulfidic minerals that do not encapsulate the gold, without excessive consumption of lixiviant chemicals. There is also a need for such pretreatments for other precious metal deposits which contain such sulfidic minerals.

Certain nickel and cobalt ores also contain iron-containing sulfidic minerals such as pyrrhotite, making the ores unsuitable for cyanide leaching. There is also a need for an effective pretreatment to make these ores cyanide-leachable.

A closely related problem, known as acid rock drainage, occurs in the case of iron-containing sulfidic materials resulting from mining and leaching of various metallic and non-metallic minerals. These sulfidic materials include, but are not limited to, tailings, overburden, discarded waste rock removed along with ore, and unmined exposed rock such as in pit walls. The natural air/water oxidation processes described previously in relation to the surface layers of a gold-bearing deposit (the oxide zone) will also occur with these materials, causing the formation of sulfuric or related acids. These acids are the cause of severe pollution problems throughout the world. Similar problems occur with the exposed surfaces resulting from coal mining.

Various attempts to correct these problems are described in U.S. Department of the Interior Bureau of Mines Publication SPO6B-94, covering the joint meeting of the International Land Reclamation and Mine Drainage Conference and the Third International Conference on the Abatement of Acidic Drainage held in April 1994. Attempts to render these sulfidic materials non-reactive included partially converting pyrrhotite into an oxide structure where each iron sulfide particle is coated with an iron oxide film, microencapsulation of pyrite by artificial inducement of $FePO_4$ coatings, and (for underground coal mines), the coating of exposed surfaces with various polymeric materials. These methods of treating such materials have been at best only partially effective. Improved treatments are necessary to treat iron-containing sulfidic minerals to prevent or minimize the natural oxidation of these materials to form destructive acids.

SUMMARY OF THE INVENTION

The process of this invention for pretreating sulfidic iron-containing ores of metals prior to lixiviating said ores comprises the steps of:

A. contacting said ores with an aqueous solution containing manganate ions or a precursor of manganate ions wherein the concentration of manganate ions, present or formed, is approximately 0.0005 mole % to saturation, and the pH of the solution is between about 6 and 13;

B. allowing a reaction between said precursor moiety and the sulfides in said ore to proceed when the solution of step A contains a manganate precursor so as to form manganate ions; and C. maintaining the pH of the reaction medium at between about 6 and 13 so as to cause the formation of a layer of manganese oxide on the surface of said sulfides.

Another process of this invention for extracting metals from sulfidic iron-containing ores comprises the steps of:

A. contacting said ores with an aqueous solution containing manganate ions or a precursor of manganate ions wherein the concentration of manganate ions, present or formed, is approximately 0.0005 mole % to saturation, and the pH of the solution is between about 6 and 13;

B. allowing a reaction between said precursor moiety and the sulfides in said ore to proceed when the solution of step A contains a manganate precursor so as to form manganate ions;

C. maintaining the pH of the reaction medium at between about 6 and 13 so as to cause the formation of a layer of manganese oxide on the surface of said sulfides; and D. contacting the pretreated ores by a lixiviating system appropriate for the extraction of the metal present in the ore.

Yet another process of this invention reducer acid rock drainage from sulfidic iron-containing rock and comprises the steps of:

A. contacting said rock with an aqueous solution containing manganate ions or a precursor of manganate ions wherein the concentration of manganate ions, present or formed, is approximately 0.0005 mole % to saturation, and the pH of the solution is between about 6 and 13;

B. allowing a reaction between said precursor moiety and the sulfides in said rock to proceed when the solution of step A contains a manganate precursor so as to form manganate ions; and C. maintaining the pH of the reaction medium at between about 6 and 13 so as to cause the formation of a layer of manganese oxide on the surface of said sulfides.

DETAILED DESCRIPTION OF THE INVENTION

In the process of this invention, iron-containing sulfidic ores of various metals especially precious and other metals such as copper, nickel and cobalt can be contacted with an aqueous solution containing manganate ion ($MnO_4^{-2}$) or a precursor of manganate ion at a pH range of about 6–13 so as to form a layer of manganese oxide on the iron-containing sulfidic mineral. The preferred pH range of the aqueous solution is 10–13. While the following discussion centers on gold ores, ores containing silver, platinum, nickel, cobalt and other metals are also amenable to such treatment.

By source of manganate ion is meant any precursor that under reaction conditions leads to the formation of manganate ion. Thus, these sources of manganate ion can include inorganic permanganate compounds and manganese dioxide with hydrogen peroxide. The preferred source of manganate ion for use in the process of the present invention is potassium permanganate.

It has been found that the optimum conditions for formation of the adherent layer containing manganese oxide require, as well as careful control of the starting pH, a relatively low manganese content for the treating solution. The pH of the reaction medium is generally maintained at between about 6 and 13. Surprisingly, the use of higher manganese contents actually reduces (but does not eliminate) the desired benefit. The manganese content of the aqueous treating solution can range from about 0.0005 mole % to saturation. A preferred range is from about 0.0012 mole % to about 0.12 mole %. Depending on conditions, this manganese can present as manganate ($MnO_4^{-2}$) ions, permanganate ($MnO_4^{-}$) ions, or a mixture.

Lixiviant systems useful in the hydrometallurgical process of the present invention include ferric chloride systems and cyanide systems. However, any lixiviant system in which the lixiviant reagent reacts with sulfides can be utilized in the process of the present invention.

The ores treatable by the present invention can contain any of several iron-containing sulfidic minerals. These include pyrrhotite, bornite, chalcopyrite, arsenopyrite and pyrite. Treatable ores are characterized by the presence of iron and sulfur in its reduced form (sulfide), and by the fact that the gold in the treatable ores is not sulfide encapsulated.

It is believed that manganate ions react with the sulfides in the iron-containing sulfidic gold ore to form a manganese oxide layer over the surface of said sulfides; X-ray photoelectron spectroscopy (XPS) evidence supports this conclusion. This layer, presumably composed of manganese dioxide, is relatively non-reactive to lixiviant systems and shields the sulfide from reaction with the lixiviant system.

It has been found that by appropriate control of pH and permanganate concentration, the resulting manganate ions can deposit a firm (non-gelatinous) adherent coating on these iron-containing sulfidic minerals. While the exact mechanism is not known, it is believed that the initial reaction is a redox reaction involving the permanganate ion and the iron-containing sulfide, leading to the formation of manganate ion. The manganate ion in turn can react by one of two competing pathways. The desired pathway results in the directed deposition of a robust manganese dioxide layer on the sulfide surface. Alternatively, manganate ions can disproportionate in solution resulting in an undesirable formation of permanganate ion and gelatinous manganese dioxide away from the surface. The process of this invention can be favored at high pH and low manganese concentrations.

Since it is believed that the passivation of the ore surface is accomplished by the generation of a protective layer of manganese dioxide on the surface, vigorous agitation during reaction which could displace or disrupt the protective layer is to be avoided. Moderate agitation is acceptable during passivation, but once lixiviation has begun, agitation should be minimal to preserve the integrity of the coating formed on the surface. Agitation commonly utilized in gold leach plants would be considered minimal.

The required contact time between the iron-containing sulfidic gold ore and the solution containing the manganate ion or the source of manganate ion can depend on the nature of the ore. In practice, for any ore of interest, this time can be readily determined by application of the procedure of Example 1, using different manganate exposure times. There is no upper time limit except as established by the economies of operation.

In industrial application, the process of this invention can be carded out at temperatures above the freezing point of the solutions employed up to about 55° C.

In the application of the process of this invention, the passivation step should be substantially complete before the introduction of the lixiviation system. While the benefits of shielding and passivating the iron-containing minerals can be maintained whether or not the manganate and permanganate ions are substantially removed at this point, their removal is preferred because they can react with and consume part of the reagents of the lixiviation system.

The process of the present invention can make certain uneconomical gold or other metal deposits economical for metal recovery by significantly reducing reagent costs. Not only can cyanide consumption be decreased, but oxygen consumption can also be decreased. These cost benefits are also important to existing mining operations because they can extend the life of a mining operation by increasing the portion of the total deposit which can be economically processed. Additional benefits resulting from the process of the present invention are an increase in leach rate (due to the fact that oxygen and cyanide consumption is reduced), and an increase in safety in that the passivation of the sulfides slows possible acidification of the cyanide leach liquor and, hence, the potential for volatilization of cyanides as HCN gas.

Iron-containing sulfidic minerals can be treated by a process of the present invention for a variety of other purposes. For example, the tailings, waste rock and other exposed surfaces at mining operations can react with atmospheric air and surface water over a period of time, as described previously in the formation of the oxide zone of gold deposits, forming destructive and polluting acid drainage. Formation of a manganese oxide-containing coating on the iron-containing sulfides that can shield them from lixiviant reagents can also shield them from atmospheric air or surface water containing oxygen to prevent or minimize acid drainage problems. Such a process for reducing acid rock drainage comprises the steps of first contacting such a rock with an aqueous solution containing manganate ions or a precursor of manganate ions wherein the concentration of manganate ions, present or formed, is approximately 0.0005 mole % to saturation, and the pH of the solution is between about 6 and 13; allowing a reaction between the precursor moiety and the sulfides in the rock to proceed in the event the solution contains a manganate precursor so-as to form manganate ions; and maintaining the pH of the reaction medium at between about 6 and 13 so as to cause the formation of a layer of manganese oxide on the surface of the sulfides.

EXAMPLE 1

Demonstration of Retardation of Cyanide Consumption

Two 1.00-g samples of pyrrhotite (Chihuahua, Mexico, 100 mesh) were each added to 500 ml of 0.01% by weight aqueous $KMnO_4$ solution (0.00115 mole %) which had been adjusted to pH 10.0 with NaOH. The slurries so formed were gently agitated on a rocker plate for 27 hrs. after which the solids were isolated and washed well with water. These two samples (1 and 2), and two more 1.00-g samples of untreated pyrrhotite (samples 3 and 4), were transferred to 50-ml Erlenmeyer flasks. Then 25.00-ml aliquots of 0.02M NaCN solution were added to each of these flasks and to one empty one (sample 5). The pH of each flask's contents was immediately adjusted to 11.0 and the flasks were stoppered. They were gently agitated on a rocker plate for one week and then 5 ml of clear solution was sampled from each flask and assayed for CN-ion concentration by silver titration. The results are listed in Table 1.

TABLE 1

| Final Cyanide Concentration | |
| --- | --- |
| Sample | Final CN⁻ Conc. (mM) |
| 1 | 14.7 |
| 2 | 14.6 |
| 3 | 7.6 |
| 4 | 7.9 |
| 5 | 19.4 |

As can be seen from Table 1, the pretreatment process of this invention (samples 1 and 2) substantially reduced cyanide consumption.

EXAMPLE 2

Long Term Retardation of Cyanide Consumption

A sample of 27.16 g of pyrrhotite pieces (Chihuahua, Mexico) was placed in 1 liter of 0.01% aqueous $KMnO_4$ (0.00115 mole %) which had been adjusted to pH 10.0 with NaOH. The mixture was placed in a stoppered 2-liter flask and gently agitated on a rocker plate for 18 hrs. The mineral pieces were isolated, washed well with water and blotted dry. This and a second sample of untreated pyrrhotite pieces (27.16 g) were each placed in chromatography columns to which were added 20.00-ml aliquots of 20 mM NaCN solution. An empty third column (control) was charged with the same NaCN solution up to the same liquid level as the first two. Every week for 8 weeks, the columns were drained and refilled with fresh 20 mM NaCN solution. The drained solutions were assayed for cyanide ion concentration by silver titration. The results are summarized in Table 2, along with results of a similar experiment using 1% potassium permanganate (0.115 mole %).

TABLE 2

| Days | Final Cyanide Concentration Treatment ($CN^-$ conc., mM) | | | |
|---|---|---|---|---|
| | Control | Untreated | 0.01% $KMnO_4$ | 1% $KMnO_4$ |
| 7 | 19.2 | 0 | 12.0 | 3.3 |
| 14 | 18.8 | 9.7 | 14.4 | 13.6 |
| 21 | 19.0 | 11.1 | 15.7 | 14.3 |
| 28 | 19.6 | 12.7 | 16.9 | 14.8 |
| 35 | 19.6 | 12.5 | 17.2 | 14.7 |
| 42 | 19.5 | 13.2 | 17.6 | 15.6 |
| 49 | 19.2 | 12.9 | 17.5 | 15.5 |
| 56 | 19.2 | 12.7 | 17.1 | 15.3 |

Both concentrations of permanganate were effective in reducing cyanide consumption compared to the untreated sample. However, the less concentrated solution of permanganate was more effective than the more concentrated solution. This surprising result is consistent with the previously proposed mechanism for the pretreatment/passivation step.

EXAMPLE 3

Pretreatment/Passivation of Pyrrhotite

Two similar samples (approximately 0.5 mm on a side) of pyrrhotite were placed in 20 ml of 0.01% by weight aqueous $KMnO_4$ (0.00115 mole %) and allowed to remain overnight after which they were rinsed with water. One sample was stored, damp, in a vial. The other was placed in 15 ml of 40 mM aqueous KCN solution overnight and then rinsed with water. These samples, and a third, untreated sample, were examined by X-ray photoelectron microscopy, capable of detecting the elements in the surface layer. The percent of manganese and sulfur found is summarized in Table 3 (ND=non-detectable).

TABLE 3

| Element | Sample Treatment (% of Element) | | |
|---|---|---|---|
| | None | $KMnO_4$ | $KMnO_4/CN^-$ |
| Mn | ND | 13.3 | 16.53 |
| S | 4.6 | ND | ND |

The high manganese content on the surface of the samples processed according to the instant invention confirmed the formation of a manganese oxide layer which was substantially unaffected by subsequent treatment with a cyanide solution. The non-detection of sulfur on the surface layer of these processed samples confirmed that the sulfidic material was substantially completely coated.

EXAMPLE 4

Effect of pH and Permanganate Concentration

Three 300-ml aliquots of 0.1% $KMnO_4$ (0.0115 mole %) were prepared. The pH of the first was adjusted to 8.0 with NaOH, the second to 10.0 and the third to 12.0. Each of these solutions was divided into three portions and each portion added to 1.00 g ground pyrrhotite. A second set of three 300-ml aliquots was prepared, containing 1% by weight (0.115 mole%), 0.1% by weight (010115 mole %), and 0.01% by weight (0.00115 mole %) of $KMnO_4$, respectively. The pH of all three solutions was adjusted to 12.0 with NaOH. These were also each divided into three portions, each of which was combined with 1.00 g ground pyrrhotite. All 18 samples were agitated overnight on a rocker plate. The solids were then isolated by filtration and washed with water. Each solid sample was transferred to a 50-ml stoppered Erlenmeyer flask. As controls, three additional 1.00-g samples of un-pretreated ground pyrrhotite were also placed in Erlenmeyer flasks. To each flask was added 25.00 ml 0.02 M aqueous NaCN, the pH of each was immediately adjusted to 11.0 with NaOH and the flasks tightly stoppered. After one week on a rocker plate agitator, a 7-ml aliquot of solution was removed from each flask and filtered. The final cyanide concentration of 5 ml of each of these samples was determined by $AgNO_3$ titration. An error obviously occurred in the titration of the first run and the point was ignored. Results are presented as the averages of remaining runs in Tables 4 and 5.

TABLE 4

| Treatment with 0.1% $KMnO_4$ | |
|---|---|
| Treatment pH | $[CN^-]$ (mM) |
| 8.0 | 10.6 |
| 10.0 | 9.7 |
| 12.0 | 12.5 |
| Control | 7.0 |

Although there was an appreciable variation in results under each set of conditions, presumably caused by variations in each sample of ground pyrrhotite, the results at a $KMnO_4$ concentration of 0.1% and a pH ranging from 8.0 to 12.0 were all substantially better than the control.

TABLE 5

| Treatment with $KMnO_4$ at pH 12.0 | |
|---|---|
| % $KMnO_4$ | $[CN^-]$ (mM) |
| 1% | 7.9 |
| 0.1% | 12.5 |
| 0.01% | 12.9 |
| Control | 7.0 |

Even at a high (1%) concentration of $KMnO_4$ and pH 12.0 the process of this invention resulted in a protective MnO2 layer formation thereby diminishing $CN^-$ consumption compared to the control. Cyanide ion consumption at lower concentrations of $KMnO_4$ (0.1% and 0.01%) was further substantially diminished.

EXAMPLE 5

Determination of $MnO_2$ Deposition on Various Iron-containing Sulfides

Three small, representative pieces each of pyrrhotite, bornite, chalcopyrite, arsenopyrite and pyrite were soaked for 23 hours in 0.01% by weight (0.00115 mole %) aqueous $KMnO_4$ at a pH of 10.0. (Each of these minerals is an iron-containing sulfide. Bornite and chalcopyrite also contain copper; arsenopyrite also contains arsenic.) After thorough rinsing the three pieces of each mineral were placed together in 4 ml of 1M HCl to dissolve any manganese oxide coating formed on the mineral surfaces. After 5 hrs., the mineral pieces were removed, washed with water and the washings were combined with the respective HCl leach solutions. The HCl leaching procedure was repeated with 0.1M HCl overnight. Both sets of HCl leachates were analyzed for Mn and the results combined to give the total amount of Mn removed from each set of mineral pieces. The results, expressed as % weight Mn per weight mineral, are summarized in Table 6.

TABLE 6

Mn Removed from Pretreated Iron-containing Sulfides

| Mineral | wt. % Mn/mineral |
|---|---|
| Pyrrhotite | 0.029 |
| Bornite | 0.047 |
| Chalcopyrite | 0.090 |
| Arsenopyrite | 0.067 |
| Pyrite | 0.128 |

The above results show that each of these minerals is susceptible to the formation of a manganese oxide-containing layer by the process of the present invention.

EXAMPLE 6

Passivation of Gold Ore

To four 2.00-g samples (no.'s 1–4) of pyrrhotite were added four portions of Au flakes (Johnson Matthey, 10 micron, 99.95%) in the following quantifies: no. 1,1.00 rag; no. 2,1.01 rag; no. 3,1.00 rag; no. 4,1.02 rag. Then 100 ml of 0.1% by weight (0.0115 mole %) aqueous $KMnO_4$ at pH 10.0 was combined with pyrrhotite/Au sample nos. 1 and 2, and 100 ml of water with sample nos. 3 and 4. The slurries were then agitated on a rocker plate overnight. The solids were isolated, washed well with water and combined with 50.00 ml 0.02 M aqueous NaCN. The samples were agitated on a rocker plate for a week, at which point 10 ml of solution, now containing dissolved gold, was withdrawn from each sample and filtered. The cyanide ion concentrations of the solutions were determined by titration with $AgNO_3$. The results are summarized in Table 7.

TABLE 7

| | Cyanide Concentration | |
|---|---|---|
| Sample | Pretreatment | Final [CN⁻0] (mM) |
| 1 | $KMnO_4$ | 12.88 |
| 2 | $KMnO_4$ | 12.38 |
| 3 | none | 8.33 |
| 4 | none | 9.49 |

The higher remaining cyanide concentrations found after the process of this invention shows that cyanide consumption was reduced when a gold-containing system was pretreated with $KMnO_4$.

EXAMPLE 7

Reduced Consumption of Non-cyanide Lixiviants

Two 50-mg samples of pyrrhotite were placed in 50-ml portions of 0.1% aqueous $KMnO_4$ solution (0.0115 mole %) which had been adjusted to pH 12.0 with NaOH. The flasks were stoppered and placed on a rocker plate agitator overnight. The solids were isolated and washed well with water. These solids and two 50-mg samples of untreated pyrrhotite were each placed in a flask with 20 ml of 3 mM $FeCl_3$ in 1% aqueous HCl. Aliquots (3 ml) were sampled at 1 hr, 4 hrs. and 23 hrs. and the Fe(3+) quantified by UV-visible spectroscopy. The average results for the two pairs of samples are shown in Table 8.

TABLE 8

| | Final $FeCl_3$ Concentration (mM) | |
|---|---|---|
| Time (hr) | Treated | Untreated |
| 1 | 3.32 | 2.97 |
| 4 | 3.37 | 2.23 |
| 23 | 3.41 | 0.39 |

These results show a reduction in ferric chloride consumption in the treated samples, with particularly striking results after 23 hours of the lixiviation treatment with $FeCl_3$.

I claim:

1. A process for pretreating sulfidic iron-containing ores of metals prior to lixiviating said ores comprising the steps of:

A. contacting said ores with an aqueous solution containing manganate ions or a precursor of manganate ions wherein the concentration of manganate ions, present or formed, is between approximately 0.0005 mole % and saturation, and the pH of the solution is between about 6 and 13;

B. allowing a reaction between said precursor moiety and the sulfides in said ore to proceed when the solution of step A contains a manganate precursor so as to form manganate ions; and C. maintaining the pH of the reaction medium at between about 6 and 13 so as to cause the formation of a layer of manganese oxide on the surface of said sulfides.

2. A hydrometallurgical process for extracting metals from sulfidic iron-containing ores wherein said metal is not sulfur-encapsulated comprising the steps of:

A. contacting said ores with an aqueous solution containing manganate ions or a precursor of manganate ions wherein the concentration of manganate ions, present or formed, is between approximately 0.0005 mole % and saturation, and the pH of the solution is between about 6 and 13;

B. allowing a reaction between said precursor moiety and the sulfides in said ore to proceed when the solution of step A contains a manganate precursor so as to form manganate ions;

C. maintaining the pH of the reaction medium at between about 6 and 13 so as to cause the formation of a layer of manganeses oxide on the surface of said sulfides; and D. contacting the pretreated ores by a lixiviating system appropriate for the extraction of the metal present in the ore.

3. A process for reducing acid rock drainage from sulfidic iron-containing rock comprising the steps of:

A. contacting said rock with an aqueous solution containing manganate ions or a precursor of manganate ions wherein the concentration of manganate ions, present or formed, is approximately 0.0005 mole % to saturation, and the pH of the solution is between about 6 and 13;

B. allowing a reaction between said precursor moiety and the sulfides in said rock to proceed to when the solution of step A contains a manganate precursor so as to form manganate ions; and C. maintaining the pH of the reaction medium at between about 6 and 13 so as to cause the formation of a layer of manganese oxide on the surface of said sulfides.

4. The process of claims 1 or 2 wherein the metal is precious metal.

5. The process of claims 1 or 2 wherein the metal is nickel, cobalt or copper.

6. The process of claim 2 wherein the permanganate and manganate ions are substantially removed before adding the lixiviating system.

7. The process of claim 2 wherein the lixiviant solution is comprised of a soluble cyanide salt or ferric chloride.

8. The process of claims 1, 2 or 3 wherein the source of manganate ion is potassium permanganate.

* * * * *